No. 667,193. Patented Feb. 5, 1901.
J. CROSBY.
COMBINED FODDER SHREDDER AND CORN HUSKER.
(Application filed May 22, 1900.)
(No Model.) 2 Sheets—Sheet 1.
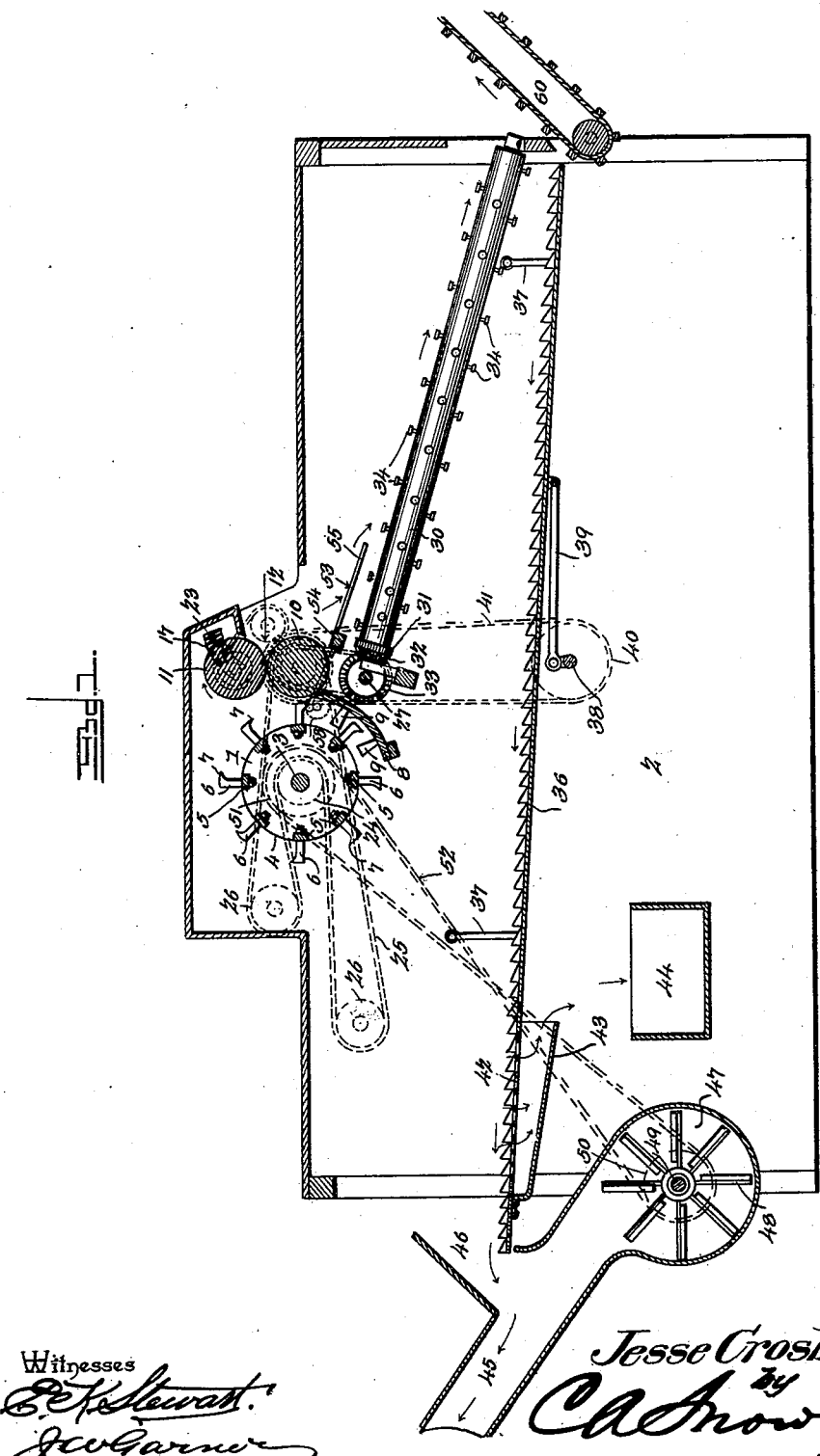
Witnesses
Jesse Crosby Inventor
by C. A. Snow & Co.
Attorneys

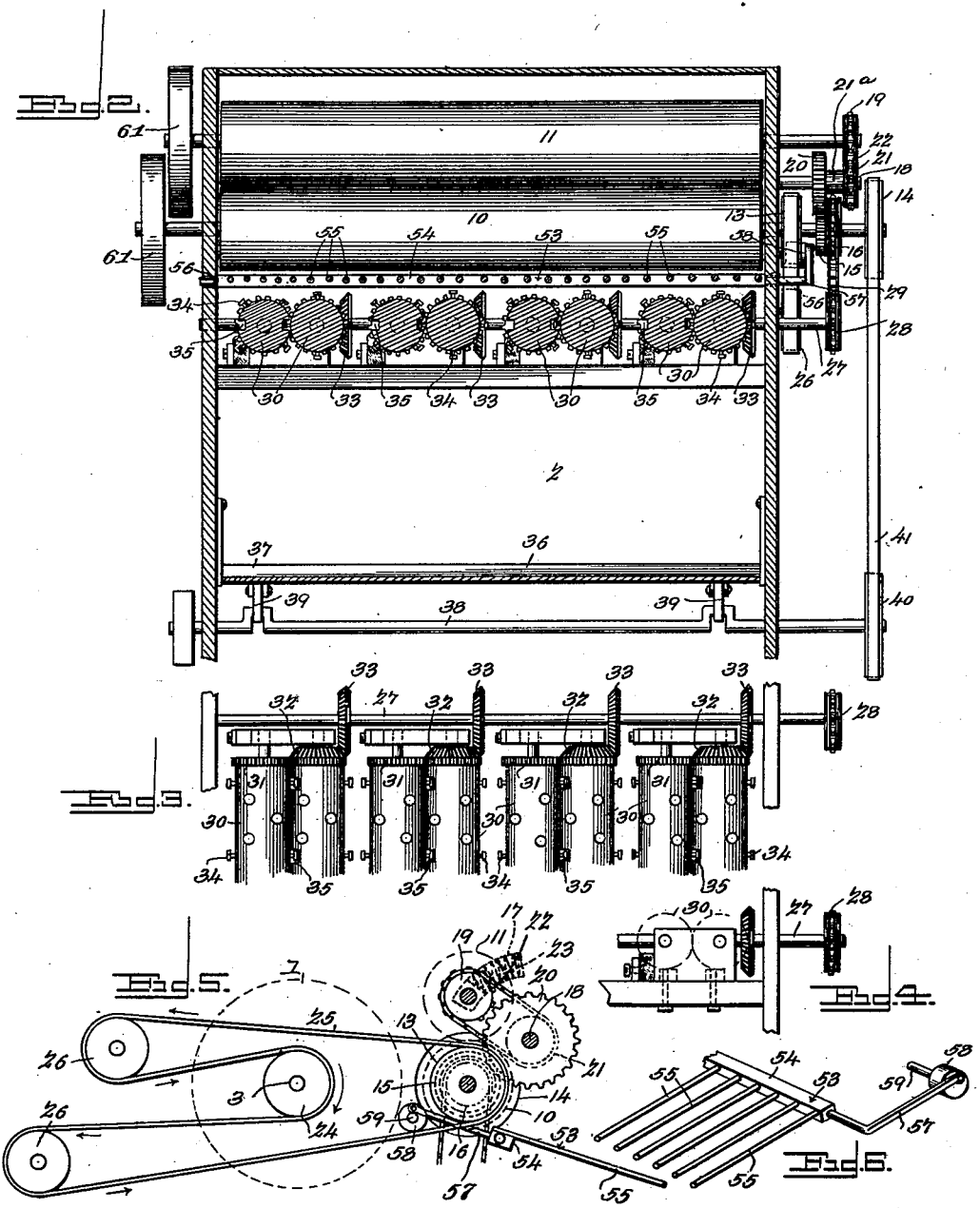

UNITED STATES PATENT OFFICE.

JESSE CROSBY, OF MADELIA, MINNESOTA.

COMBINED FODDER-SHREDDER AND CORN-HUSKER.

SPECIFICATION forming part of Letters Patent No. 667,193, dated February 5, 1901.

Application filed May 22, 1900. Serial No. 17,586. (No model.)

*To all whom it may concern:*

Be it known that I, JESSE CROSBY, a citizen of the United States, residing at Madelia, in the county of Watonwan and State of Minnesota, have invented a new and useful Combined Fodder-Shredder and Corn-Husker, of which the following is a specification.

My invention is a combined fodder-shredding and corn-husking machine, one object of my present improvements being to provide a novel form of apparatus for husking corn.

A further object of my invention is to provide improved means for shredding the corn-fodder.

A further object of my invention is to combine with the snapping-rolls a novel form of mechanism for feeding the corn to the husking-rolls and disposing the same parallel with the husking-rolls while feeding the same thereto.

A further object of my invention is to produce a combined fodder-shredding and corn-husking machine which is adapted for the purposes of pulling the ears from the stalks, shredding the fodder, husking the corn, and separating the loosened grains from the shredded fodder, thereby saving the grains.

My invention consists in the peculiar construction and combination of devices hereinafter fully set forth, and pointed out in the claim.

In the accompanying drawings, Figure 1 is a vertical longitudinal sectional view of a combined fodder-shredding and corn-husking machine embodying my improvements. Fig. 2 is a vertical transverse sectional view of the same. Fig. 3 is a detail top plan view of the husking-rolls and their operative connections. Fig. 4 is a detail view. Fig. 5 is a detail view showing the power connections for transmitting power from the shredding-cylinder to the snapping-rolls. Fig. 6 is a detail perspective view of a portion of the feed-grate for delivering the ears to the husking-rolls.

In the embodiment of my invention the shredding-cylinder 1, which is disposed transversely in the inclosing case 2, is located on a shaft 3 and comprises circular heads 4, longitudinally-disposed bars 5, which connect the said heads, and shredding-knives 6, which project radially from the said bars. The said shredding-knives are separately secured to the bars 5, being provided with extended bolt-shanks, which pass through the said bars, and with clamping-nuts, as shown, whereby they may be secured to and readily detached from the said bars, and the points of said shredding-knives are extended forward in the plane of revolution, as at 7. The front edges and the points of the shredding-knives are sharpened.

A concave 8 is disposed opposite the cylinder 1, on the lower front side of the same, and is provided with suitable teeth 9, which project therefrom and between which the shredding-knives of the shredding-cylinder pass when the machine is in operation, the said concave coacting with the shredding-cylinder to shred the corn-fodder as the same passes between them, as will be readily understood.

A pair of snapping-rolls 10 11 are disposed in front of the shredding-cylinder and opposite the feed-opening 12, which is formed in the casing. The shaft of the lower snapping-roller 10 is journaled in fixed bearings and is provided at one end with power pulleys 13 14, a spur-gear 15, and a sprocket-wheel 16. The shaft of the upper snapping-roll 11 is adapted to play in openings 17, which are concentric with a stub-shaft 18 on one side of the casing, and the said shaft of said roll 11 is provided with a sprocket-wheel 19. On the said stub-shaft 18 is a gear-wheel 20, which engages the gear 15, and a sprocket-wheel 21, which is secured to the gear 20, as by a sleeve $21^a$, and rotates with said gear 20 and is connected to the sprocket-wheel 19 by an endless sprocket-chain 22. Bearing-springs 23 keep the upper snapping-roll normally in contact with the lower snapping-roll, thereby subjecting the fodder to compression between the said rolls. A pulley 24 on the shaft of the shredding-cylinder is connected by an endless belt 25 to the pulley 13 on the shaft of the lower snapping-roll 10. The said endless belt passes over guide-pulleys 26, suitably mounted on one side of the casing, as shown.

A shaft 27 extends transversely through the casing 2, has its bearings in the sides thereof, is disposed below the lower snapping-roll 10, and is provided at one end with a sprocket-wheel 28, which is connected to the sprocket-wheel 16 by an endless sprocket-chain 29. A series of pairs of husking-rolls 30 are disposed longitudinally in the front portion of the casing 2 and at a suitable inclination, as shown. The said husking-rolls are geared together in pairs by means of gears 31, and one of each pair of husking-rolls is provided with a miter gear-wheel 32, which engages a similar gear-wheel 33 on the shaft 27, whereby power is communicated from said shaft 27 to the husking-rolls and the latter are caused to rotate, the rolls of each pair of husking-rolls revolving in opposite directions. The said husking-rolls are provided with projecting headed husking-studs 34 and coacting recesses 35, which receive the heads of said studs as said rolls rotate, whereby the opposing sides of the pairs of husking-rolls are in contact with each other under all conditions.

A shaking feed-shoe 36 is disposed longitudinally in the casing 2 and extends from the front side thereof through the rear side of said casing and is suspended by rocking links 37. The said shaking-shoe is reciprocated by a crank-shaft 38 and pitmen 39, which connect the cranks of said shaft to the said shaking-shoe, and said crank-shaft is provided at one end with a pulley 40, which is connected to the pulley 14 of lower snapping-roll 10 by an endless belt 41. A screen 42 is disposed near the rear end of the shaking-shoe 36, and under the said screen is disposed an inclined spout or plate 43, which discharges into a trough or other suitable receptacle, (indicated at 44.)

A pneumatic stacker-tube 45 projects from the rear side of the casing 2. The said stacker-tube has an intake 46, which is coincident with the rear end of the shaking-shoe 36 and is provided at its lower pivotal end with a fan-casing 47, in which is a blast-fan 48. The shaft 49 of said blast-fan is provided with a pulley 50, which is connected to a pulley 51 on the shaft of the shredding-cylinder by a crossed endless belt 52.

I will now describe my improved feed-grate and its operative connections, which dispose the ears as they are snapped from the stalks by the snapping-rolls in parallel relation to the husking-rolls and feed the ears to said husking-rolls.

The grate 53 comprises the shaft or head 54 and the parallel fingers or bars 55, which project rearward therefrom. The said shaft or head is pivotally mounted in elongated openings 56 in the sides of the casing 2 and is provided at one end with a crank-arm 57, which is connected to a crank-wheel 58, mounted on a stub-shaft 59 on one side of the casing 2 and which is rotated by engagement with the lower lead of the endless belt 25, as shown. The grate 53 is disposed over the upper ends of the pairs of husking-rolls, and it will be understood from the foregoing description and by reference to the drawings that the belt 25, wheel 58, and crank 57 impart oscillatory motion to the said grate, thereby causing the same to rock, the fingers or bars thereof moving up and down, and said grate also vibrates or reciprocates longitudinally, and hence the said grate, which is disposed below the snapping-rolls and on which the ears of corn drop, serves by its motion and the parallel arrangement of its fingers or bars to dispose the ears parallel to the husking-rolls as the ears drop from the grate to the husking-rolls, as will be understood.

An endless elevator 60, which is disposed below the discharge end of the husking-rolls, extends upward and outward from the casing 2, receives the husked corn as the same is delivered from the husking-rolls, and conveys the same to a suitable receptacle, as a wagon or the like.

The shoe 36 conveys the shredded fodder rearward in the casing 2 and delivers the same through the intake 46 into the stacker-tube 45, through which the shredded fodder passes pneumatically, being blown through the stacker-tube by the blast created by the fans 48. It will be observed by reference to Fig. 1 of the drawings that the blast-fan and pneumatic stacker-tube, by reason of the intake 46 of the latter, sets up an exhaust-current in the rear portion of the casing 2, between the shredding mechanism and the shoe 36, which coacts with the said shoe in conveying the shredded fodder to the stacker-tube.

Such grains of corn as fall from the ears undergoing the husking operation are caught by the shoe 36 and in passing over the screen 42 at the rear end thereof are separated from the shredded fodder and fall upon the plate or spout 43, which serves to convey the shelled corn to the receiver 44.

By reason of the connections hereinbefore described between the lower snapping-roll and the upper snapping-roll the latter is at all times positively rotated, as well as the lower snapping-roll.

The snapping-rolls are provided with fly-wheels 61 (shown in Fig. 2) to facilitate the rotation thereof when in operation at a uniform rate of speed.

Having thus described my invention, I claim—

The combination of the snapping-rolls, one of which has a pulley 13 on its shaft, a shredding mechanism having a cylinder disposed on one side of the snapping-rolls and carrying a pulley 24 on its shaft, husking-rolls having their upper ends under the snapping-rolls, a longitudinally-movable and rocking grate in elongated bearings disposed below the snapping-rolls and above the husking-rolls, and having a crank-arm rigidly connected thereto, a pulley 58 in a fixed bearing and having a wrist-pin to which said crank-arm is attached, and a power-belt engaging said pulleys 13, 24 and 58, substantially as described.

In testimony that I claim the foregoing as my own I have hereto affixed my signature in the presence of two witnesses.

JESSE CROSBY.

Witnesses:
   EDWARD C. FARMER,
   CLARA FITZSIMMONS.